United States Patent

[11] 3,619,134

| [72] | Inventors | Charles S. Park, deceased<br>late of Baltimore by Gwen J. Burke,<br>administratrix;<br>Philip K. Maher, Baltimore, both of Md. |
|---|---|---|
| [21] | Appl. No. | 18,793 |
| [22] | Filed | Mar. 16, 1970 |
| [45] | Patented | Nov. 9, 1971 |
| [73] | Assignee | W. R. Grace & Co.<br>New York, N.Y.<br>Continuation of application Ser. No.<br>633,355, Apr. 21, 1967, now abandoned. |

[54] METHOD OF PRODUCING SMALL PARTICLE SIZE Z-14 ZEOLITE
4 Claims, No Drawings

[52] U.S. Cl. ................................................. 23/113, 252/455
[51] Int. Cl. ................................................. C01b 33/28
[50] Field of Search ................................. 23/111–112, 113; 252/455

[56] References Cited
UNITED STATES PATENTS

| 2,882,244 | 4/1959 | Milton | 23/113 |
|---|---|---|---|
| 2,979,381 | 4/1961 | Gottstine et al. | 23/113 |
| 2,992,068 | 7/1961 | Haden et al. | 23/112 |
| 3,185,544 | 5/1965 | Maher | 23/112 |
| 3,321,272 | 5/1967 | Kerr | 23/113 |
| 3,341,284 | 9/1967 | Young | 23/112 |
| 3,343,913 | 9/1967 | Robson | 23/113 |

*Primary Examiner*—Edward J. Meros
*Attorney*—Kenneth E. Prince

ABSTRACT: Method of producing crystalline Z-14 zeolite having a particle size in the range of 20 to 200 millimicrons, wherein a reaction mixture having controlled molar ratios of $Na_2O$, $SiO_2$, $Al_2O_3$ and $H_2O$ is prepared at a low temperature, preferably within the range of −5° C. to +5° C. digested, and thereafter refluxed for a period of time to crystallize Z-14 zeolite having the desired particle size. The product is particularly suited, either in pure form or dispersed in a matrix, as a catalyst in the treatment of hydrocarbons.

METHOD OF PRODUCING SMALL PARTICLE SIZE Z-14 ZEOLITE

This application is a continuation of application Ser. No. 633,355 filed Apr. 21, 1967, now abandoned.

This invention relates to a novel Z-14 crystalline zeolite which is distinguished by its exceptionally small particle size and to a method of making this zeolite. More particularly, this invention relates to a low temperature mixing and aging process of preparing our novel zeolite. Our process is further characterized by the careful control of the following variables; aging time, refluxing time, and the relative molar quantities of sodium oxide and water respectively, in the reaction mixture. Our novel Z-14 zeolite is distinguished from the Z-14 zeolites of the prior art by its uniquely small particle size, the particle size of our product ranges from a maximum of 200 millimicrons to a minimum of 20 millimicrons. In the preferred form, our zeolite has a maximum particle size of 100 millimicrons.

The aluminosilicate zeolites, and particularly the Z-14 type zeolite, are of particular interest because of their selective adsorption properties and extremely high catalytic activity to promote certain acid type catalyzed reactions, particularly hydrocarbon cracking. Because of their extremely high activity, zeolite materials are seldom used as catalysts in the pure form, but rather are used dispersed throughout a matrix material of considerably less activity such as, for example, silica gel, alumina or silica-alumina. One problem which arises in the matrix form of the catalyst is that because of the large particle size of the zeolites of the prior art, the extreme catalytic activity of the catalyst will be necessarily located and concentrated within a relatively few number of centers throughout the catalyst matrix. This, of course, results in poor catalytic contact with the reactants and poorer stripping or desorption of the reaction products from the active centers than is desirable. By using our Z-14 zeolite which has a very small particle size, we are able to obtain very good distribution of the zeolite throughout the matrix and, thus, enhance catalytic contact with the reactants and the desorption of the reaction products from the active zeolite particles. Where it is desired to use the zeolite in its pure form, that is, without a matrix, our very small particle size facilitates intimate distribution and dispersion throughout the reaction material and similarly facilitates the rapid stripping of the reaction products or adsorbed material.

Chemically, the Z-14 zeolites may be represented by the general formula:

$M_{2/n}O:Al_2O_3:2-3SiO_2:yH_2O$ where M is a cation and $n$ is its valence and $y$ is a function of the degree of dehydration and ranges between 0 to 8.

The structure of a number of the zeolites has been shown to be based on units consisting of tetrahedra, of silica and alumina which, in turn, are connected to form a cubo-octahedral unit similar to that found in the natural sodalite. A variation in stacking or combination of these octahedral units will lead to a variety of zeolites; the Z-14 zeolite having a structure characterized as the faujasite zeolite structure. The faujasite structure consists of a diamond type lattice of the cubo-octahedral units joined by pairs of 6-membered rings. This is a well ordered structure having all the aluminum atoms tetrahedrally coordinated with oxygen and having one excess negative charge for each aluminum atom in the lattice. This charge is electrically balanced by the presence of a cation that has a great degree of mobility and which may be exchanged with other cations in various embodiments. The Z-14 crystalline zeolite is also referred to as type X by the Linde Division of Union Carbide Corporation, and further generalized information of this type of zeolite may be obtained from U.S. Pat. No. 2,882,244.

The crux of our inventive method resides in a cold mixing process wherein certain variables are controlled within specific ranges. These variables being aging time, refluxing time, and the mole ratios of sodium oxide and water respectively in the initial admixed reaction slurry. The mixing temperature is also critical in that the temperatures of the initial silicate solution and aluminate solution and the admixing temperature must be between $-15°$ C. and $+15°$ C., preferably $-5°$ C. to $+5°$ C. Some product quality optimization may be obtained by adjusting the respective temperatures within these ranges.

It should be stressed that there is no continuum of ranges which will produce our product, but rather only small relatively removed discrete ranges of these variables which will produce our product. This will be pointedly exemplified by the examples. Briefly, our process may be successfully effected, using a commercial sodium silicate (28.5% $SiO_2$, 8.7% $Na_2O$), sodium meta silicate, etc., to prepare the silicate solution, by using the following discrete ranges:

A.
Initial Slurry Mole Ratio:
10.7-13 Na2O:6 $SiO_2$:$Al_2O_3$ 350-450 $H_2O$
Aging Time: at least 15 hours
Reflux Time: 5-7 hours B.
Initial Slurry Mole Ratio:
9-11 $Na_2O$:6 $SiO_2$:$Al_2O_3$:275-375 $H_2O$
Aging Time: at least 15 hours
Reflux Time: 5-7 hours C.
Initial Slurry Mole Ratio:
9-11 $Na_2O$:6 $SiO_2Al_2O_3$:300-450 $H_2O$
Aging Time: at least 40 hours
(preferably at least 48 hours)
Reflux Time: 5-7 hours The process according to our invention may be effected by preparing a solution of sodium silicate by dissolving the desired quantity of commercial sodium silicate (28% $SiO_2$, 8.7% $Na_2O$) and the desired quantity of sodium hydroxide in the desired amount of water. The solution may be cooled by adding ice directly to the solution and adjusting the quantity of water used accordingly or the solution may be cooled by conventional means such as, for example, a cooling bath. A solution of sodium aluminate is similarly made by dissolving the desired quantity of sodium aluminate and sodium hydroxide in the desired amount of water. Again, the solution may be cooled by adding ice directly to the solution and compensating the quantity of water used accordingly or the solution may be cooled by conventional cooling means, e.g., a cooling bath. It must be stressed here that the quantities of these reactant materials are all controlled to give an initial reaction slurry upon admixing, within the critical ranges set forth above. Further, the quantities of sodium silicate and sodium aluminate must, of course, be adjusted so that the final product produced will have the desired Z-14 zeolite silica-alumina ratio, that is, a silica-alumina ratio of from 2 to 3. The quantity of sodium hydroxide added is carefully controlled to give the mole ratio of sodium oxide desired in the initial starting slurries. The two solutions are than admixed together with moderate mixing and allowed to age for at least 8 hours at room temperature to facilitate precipitation or crystallization of our novel Z-14 product. After aging, the solution, now a slurry, is refluxed for from 4 to 15 hours to further facilitate crystallization and/or precipitation. Our Z-14 product is then separated from the solution by conventional separation means such as, for example, centrifuging or filtration. The separated product is then washed and dried at a temperature of from 100° C. to 600° C.

In an alternate embodiment, sodium metasilicate (Na2SiO3· 9H2O) ) may be used rather than 28% sodium silicate. The manipulative steps in this embodiment are the same as in the preferred embodiment but the initial conditions are different. In this embodiment the following critical conditions are required to produce our small particle size product.

A. Initial Reaction Slurry Mole Ratio:
11-13 $Na_2O$:6 $SiO_2$:$Al_2O_3$: 380-420 $H_2O$
Aging Time: at least 20 hours
Reflux Time: 5-7 hours B. Initial Reaction Slurry Mole Ratio:
7-9 $Na_2O$:4 $SiO_2$:$Al_2O_3$: 300-340 $H_2O$ Aging Time: at least 40 hours
Reflux Time: 5–7 hours Our invention is further illustrated by the following illustrative but nonlimiting examples.

EXAMPLE I

This example illustrates the process according to our invention for producing our inventive product, wherein initial admixed slurry has the following mole ratio:

11.5$Na_2O$:6 $SiO_2$:$Al_2O_3$:400 $H_2O$.)

A sodium silicate solution was prepared by mixing 126 grams of sodium silicate (28.5% $SiO_2$, 7.8% $Na_2O$) and 32.8 grams of sodium hydroxide into 200 ml. of water. The solution was then cooled and further water added by adding 200 grams of ice. A sodium aluminate solution was prepared by dissolving 21.8 grams of sodium aluminate and 34.8 grams of sodium hydroxide and 121 ml. of water. The solution was then cooled and additional water added by the addition of 200 grams of ice. The respective temperatures of the cooled sodium silicate and cooled sodium aluminate solutions were respectively −4° C. and −9° C. The two solutions were then quickly mixed together with stirring, a thin gel formed instantly. The solution, now a slurry, was then aged 20 hours at room temperature and then refluxed 6 hours. The slurry was then filtered, washed and then dried at 100° C. for 3 hours.

The dried product was examined by conventional X-ray means and found to contain a major portion of our novel Z–14 zeolite and only a trace of sodalite contaminant. The particle size was determined by electron microscopy to be between 30 to 80 m$\mu$. The surface area of the Z–14 zeolite was determined after being heated for 2 hours at 800° F., by the conventional Brunaurer-Emmett-Teller test using nitrogen, and found to be 503 m2/g.

EXAMPLE II

This example illustrates the method according to our method of producing our product, using commercial sodium silicate and an initial admix slurry having the following mole ratio, 10 $Na_2O$:6 $SiO_2$:$Al_2O_3$: 300 $H_2O$.

A sodium silicate solution was prepared by mixing 157.5 grams of sodium silicate (28.5% $SiO_2$, 7.8% Na2O) and 36 grams of sodium hydroxide into 100 ml. of water. The solution was then cooled and further water added by adding 172 grams of ice. A sodium aluminate solution was prepared by dissolving 27.2 grams of sodium aluminate and 36 grams of sodium hydroxide in 177 ml. of water. The solution was then cooled and additional water added by the addition of 100 grams of ice. The respective temperatures of the cooled sodium silicate and cooled sodium aluminate solutions were respectively −3° C. and −5° C. The two solutions were then quickly mixed together with stirring, a thin gel formed instantly. The solution, now a slurry, was then aged 20 hours at room temperature and then refluxed 6 hours. The slurry was then filtered, washed and then dried at 100° C. for 3 hours.

The dried product was examined by conventional X-ray means and found to contain a major portion of our novel Z–14 zeolite and only a trace of sodalite contaminant. The particle size was determined by electron microscopy to be between 40 to 80 m$\mu$. The surface area of the Z–14 zeolite was determined after being heated for 2 hours at 800° F., by the conventional Brunaurer-Emmett-Teller test using nitrogen, and found to be 521 m²/g.

EXAMPLE III

This example illustrates the method according to our method of producing our product, using commercial sodium silicate and an initial admix slurry having the following mole ratio, 10 $Na_2O$:6 $SiO_2$:$Al_2O_3$:400 $H_2O$ and an aging time of 66 hours.

A sodium silicate solution was prepared by mixing 126 grams of sodium silicate (28.5% $SiO_2$, 7.8% $Na_2O$) and 28.8 grams of sodium hydroxide in 111 ml. of water. The solution was then cooled and further water added by adding 200 grams of ice. A sodium aluminate solution was prepared by dissolving 21.8 grams of sodium aluminate and 28.8 grams of sodium hydroxide and 112 ml. of water. The solution was then cooled and additional water added by the addition of 200 grams of ice. The respective temperatures of the cooled sodium silicate and cooled sodium aluminate solutions were respectively −3° C. and −9° C. The two solutions were then quickly mixed together with stirring, a thin gel formed instantly. The solution, now a slurry, was then aged 66 hours at room temperature and then refluxed 6 hours. The slurry was then filtered, washed and then dried at 100° C. for 3 hours.

The dried product was examined by conventional X-ray means and found to contain a major portion of our novel Z–14 zeolite and only a trace of sodalite contaminant. The particle size was determined by electron microscopy to be between 80 to 100 m$\mu$. The surface area of the Z–14 zeolite was determined after being heated for 2 hours at 800° F., by the conventional Brunaurer-Emmett-Teller test using nitrogen, and found to be 672 m²/g.

EXAMPLE IV

This example illustrates the method according to our method of producing our product, using sodium metasilicate ($Na_2SiO_3$:9 $H_2O$) and an initial admix slurry having the following mole ratio, 12 $Na_2O$:6 $SiO_2$:$Al_2O_3$:400 $H_2O$.

A sodium silicate solution was prepared by mixing 170.5 grams of sodium metasilicate and 20 grams of sodium hydroxide into 208 ml. of water. The solution was then cooled and further water added by adding 100 grams of ice. A sodium aluminate solution was prepared by dissolving 21.8 grams of sodium aluminate and 20 grams of sodium hydroxide in 100 ml. of water. The solution was then cooled and additional water added by the addition of 200 grams of ice. The respective temperatures of the cooled sodium metasilicate and cooled sodium aluminate solutions were respectively 2° C. and −9° C. The two solutions were then quickly mixed together with stirring, a thin gel formed after 30 seconds. The solution, now a slurry, was maintained at about 0° C. for 3 hours and then aged 18 hours, with stirring, at room temperature. After aging the solution was refluxed 6 hours. The slurry was then filtered, washed and then dried at 100° C. for 3 hours.

The dried product was examined by conventional X-ray means and found to contain a major portion of our novel Z–14 zeolite and only a trace of sodalite contaminant. The particle size was determined by electron microscopy to be between 40 to 80 m$\mu$. The surface area of the Z–14 zeolite was determined after being heated for 2 hours at 800° F., by the conventional Brunaurer-Emmett-Teller test using nitrogen, and found to be 427 m²/g.

EXAMPLE V

This example illustrates the method according to our method of producing our product, using sodium metasilicate ($Na_2SiO_3 \cdot 9H_2O$) and an initial admix slurry having the following mole ratio, 8$Na_2O$:4$SiO_2$:$Al_2O_3$:320 $H_2O$ and an aging time of 48 hours.

A sodium silicate solution was prepared by mixing 142.1 grams of sodium metasilicate and 15 grams of sodium hydroxide in 225 ml. of water. The solution was then cooled and further water added by adding 100 grams of ice. A sodium aluminate solution was prepared by dissolving 27.2 grams of sodium aluminate and 15 grams of sodium hydroxide in 100 ml. of water. The solution was then cooled and additional water added by the addition of 200 grams of ice. The respective temperatures of the cooled sodium metasilicate and cooled sodium aluminate solutions were respectively 0° C. and 5.5° C. The two solutions were then quickly mixed together with stirring, a thin gel formed instantly. The solution, now a slurry, was then aged 48 hours at room temperature and then refluxed 6 hours. The slurry was then filtered, washed and then dried at 100° C. for 3 hours.

The dried product was examined by conventional X-ray means and found to contain a major portion of our novel Z-14 zeolite and only a trace of sodalite contaminant. The particle size was determined by electron microscopy to be between 20 to 80 mµ. The surface area of the Z-14 zeolite was determined after being heated for 2 hours at 800° F., by the conventional Brunaurer-Emmett-Teller test using nitrogen, and found to be 688 m²/g.

Additional examples were run using the same conditions, with the exception of varying one of the initial variables, to illustrate the necessity of remaining within the initial ranges previously set forth. These examples and the above examples are summarized in the following tables.

TABLE I.—28% SODIUM SILICATE
[Reflux time: 6 hours; mixing temperatures: −9° C. to 4°C.]

| Sample No. | $Na_2O$ | $SiO_2$ | $Al_2O_3$ | $H_2O$ | Aging (hours) | Product | Particle size (millimicrons) | Surface area, m²/gram |
|---|---|---|---|---|---|---|---|---|
| A-1 | 10 | 6 | 1 | 400 | 20 | Z-14 and Z-7* trace | | |
| A-2 | 11 | 6 | 1 | 400 | 20 | Z-14 major, Z-7 minor | 600–800 | 637 |
| A-3 (I) | 11.5 | 6 | 1 | 400 | 20 | Z-14 major, Z-7 trace | 30–60 | 500 |
| A-4 | 12 | 6 | 1 | 400 | 20 | ...do... | 30–80 | 503 |
| A-5 | 14 | 6 | 1 | 400 | 20 | Z-14 and Z-7 | 30–150 | 432 |
| | | | | | | | 400–800 | 406 |
| B-1 | 10 | 6 | 1 | 200 | 20 | Sodalite | | |
| B-2 (II) | 10 | 6 | 1 | 300 | 20 | Z-14 major, Z-7 trace | | |
| B-3 | 10 | 6 | 1 | 350 | 20 | ...do... | 40–80 | 521 |
| B-4 | 10 | 6 | 1 | 400 | 20 | ...do... | 80–90 | 656 |
| | | | | | | | 600–800 | 637 |
| C-1 | 10 | 6 | 1 | 400 | 8 | Z-14 major | | |
| C-2 | 10 | 6 | 1 | 400 | 48 | Z-14 only | 500–1,000 | 344 |
| C-3 (III) | 10 | 6 | 1 | 400 | 66 | Z-14 major, Z-7 trace | 100–200 | 669 |
| | | | | | | | 80–100 | 672 |

*Z-7—Sodalite contaminant.
NOTE.—Roman numerals in parentheses are example numbers.

TABLE II.—SODIUM METASILICATE $Na_2SiO_3 \cdot 9H_2O$
[Reflux time: 6 hours; mixing temperatures: −9° C. to 4° C.]

| Sample No. | $Na_2O$ | $SiO_2$ | $Al_2O_3$ | $H_2O$ | Aging (hours) | Product | Particle size (millimicrons) | Surface area, m²/gram |
|---|---|---|---|---|---|---|---|---|
| A'-1 | 10 | 6 | 1 | 400 | 20 | Z-14 major, Z-7 minor | | |
| A'-2 (IV) | 12 | 6 | 1 | 400 | 20 | ...do... | 500–900 | 703 |
| | | | | | | | 40–80 | 427 |
| B'-1 | 8 | 4 | 1 | 320 | 20 | Z-14 | | |
| B'-2 (V) | 8 | 4 | 1 | 320 | 48 | Z-14 | 300–600 | 747 |
| | | | | | | | 20–80 | 688 |

NOTE.—Roman numerals in parentheses are roman numerals.

From the above tables it may be seen that where the variable falls outside the given discrete critical range our small particle Z-14 zeolite will not be produced. Note, for example, samples A-1 through A-5 of table I. In samples A-1 and A-5 the initial $Na_2O$ mole ratio was not maintained and the resulting Z-14 zeolite had a particle size above the 200 millimicron limit. Similar results are shown in the above table for each discrete critical range.

It should be noted that although the primary concern of our process is with the production of small sized Z-14 zeolites and the necessary maintaining of the critical ranges, that the overall cold mixing process has utility with respect to producing the large size zeolites of the prior art. Such large size zeolites may be made according to our cold mixing process by not maintaining the critical ranges.

Obviously, our invention is capable of modification and variation without departing from the essence and scope of the invention and only such limitations as are set forth in the appended claims should be applied.

What we claim is:

1. A cold mixing method of producing Z-14 zeolite in a particle size of 20 to 200 millimicrons comprising:
   a. preparing an initial admixed slurry having a mole ratio of components of 10.7–13 $Na_2O$:6 $SiO_2$:$Al_2O_3$:350–450 $H_2O$ by admixing sodium silicate, sodium hydroxide and water to form a sodium silicate solution, and admixing sodium aluminate, sodium hydroxide and water to form a sodium aluminate solution, cooling each formed solution to within the temperature range of −15° C. to −5.5° C. and admixing said solutions with agitation,
   b. aging the slurry formed on admixing for at least 15 hours,
   c. refluxing the aged slurry for from 5–7 hours whereby crystalline zeolite Z-14 is formed, and
   d. separating the crystalline Z-14 zeolite.

2. A cold mixing method of producing Z-14 zeolite in a particle size of 20 to 200 millimicrons comprising:
   a. preparing an initial admixed slurry having a mole ratio of components of 9–11 $Na_2O$: 6 $SiO_2$:$Al_2O_3$: 275–375 $H_2O$ by admixing sodium silicate, sodium hydroxide and water to form a sodium silicate solution, and admixing sodium aluminate, sodium hydroxide and water to form a sodium aluminate solution, cooling each formed solution to within the temperature range of −15° C. to 5.5 °C. and admixing said solutions with agitation,
   b. aging the slurry formed on admixing for at least 15 hours,
   c. refluxing the aged slurry for from 5–7 hours whereby crystalline zeolite Z-14 is formed, and
   d. separating the crystalline Z-14 zeolite.

3. A cold mixing method of producing Z-14 zeolite in a particle size of 20 to 200 millimicrons comprising:
   a. preparing an initial admixed slurry having a mole ratio of components of 11–13 $Na_2O$:6 $SiO_2$: $Al_2O_3$: 380–420 $H_2O$ by admixing sodium metasilicate, sodium hydroxide and water to form a sodium metasilicate, sodium hydroxide and water to form a sodium silicate solution, and admixing sodium aluminate, sodium hydroxide and water to form a sodium aluminate solution, cooling each formed solution to within the temperature range of −15° C. to +5.5° C., and admixing said solutions with agitation,
   b. aging the slurry formed on admixing for at least 20 hours,
   c. refluxing the aged slurry for from 5–7 hours whereby crystalline zeolite Z-14 is formed,
   d. separating the crystalline Z-14 zeolite.

4. A cold mixing method of producing Z-14 zeolite in a particle size of 20 to 200 millimicrons comprising:
   a. preparing an initial admixed slurry having a mole ratio of components of 7–9 $Na_2O$:4 $SiO_2$:$Al_2O_3$:300–340 $H_2O$ by admixing sodium metasilicate, sodium hydroxide and water to form a sodium silicate solution, and admixing sodium aluminate, sodium hydroxide and water to form a sodium aluminate solution, cooling each formed solution to within the temperature range of −15° C. to +5.5° C., and admixing said solutions with agitation,
   b. aging the slurry formed on admixing for at least 40 hours,
   c. refluxing the aged slurry for from 5–7 hours whereby crystalline zeolite Z-14 is formed, and
   d. separating the crystalline Z-14 zeolite.

* * * * *

UNITED STATES PATENT OFFICE
CERTIFICATE OF CORRECTION

Patent No. 3,619,134     Dated November 9, 1971

Inventor(s) Charles S. Park, et al

It is certified that error appears in the above-identified patent and that said Letters Patent are hereby corrected as shown below:

Claim 1, line 9, "-5.5°C" should read -- "+5.5°C. --.

Signed and sealed this 31st day of October 1972.

(SEAL)
Attest:

EDWARD M. FLETCHER, JR.
Attesting Officer

ROBERT GOTTSCHALK
Commissioner of Patents